United States Patent

[11] 3,622,000

| [72] | Inventor | Hewie D. McClenny<br>Route 1, Oneonta, Ala. 35121 |
|---|---|---|
| [21] | Appl. No. | 881,249 |
| [22] | Filed | Dec. 1, 1969 |
| [45] | Patented | Nov. 23, 1971 |

[54] POULTRY SELECTOR SYSTEM
6 Claims, 4 Drawing Figs.

[52] U.S. Cl. .................................................. 209/121,
177/163, 198/39, 198/177
[51] Int. Cl. .................................................. B07c 5/20
[50] Field of Search ........................................... 209/121,
73, 74, 111.7; 177/163, 121; 198/38, 39, 177

[56] References Cited
UNITED STATES PATENTS

| 1,712,700 | 5/1929 | Hardenbergh ................ | 209/121 |
| 2,612,265 | 9/1952 | Altenpohl ..................... | 209/121 |
| 2,962,938 | 12/1960 | De Buigne .................... | 209/121 X |
| 3,291,303 | 12/1966 | Altenpohl ..................... | 209/121 |

Primary Examiner—Richard A. Schacher
Attorney—Jones & Thomas

ABSTRACT: A poultry selector system for removing poultry within a predetermined weight range from a conveyor line. The shackles of a poultry conveyor are moved across a supporting track, and a moveable section of the supporting track yields under the weight of each shackle as the shackle travels along the track. The moveable track section is hingedly connected across the stationary track section and opens in a downward direction when a poultry-carrying shackle moves across it. The moveable track section then forms an inclined ramp and guides the shackle back onto the stationary track. An element moveable with the track section is positioned adjacent a line of photosensitive cells and arranged to sequentially block the light entering the photosensitive cells when moving with the moveable track section. One of the photosensitive cells is connected to an ejecting mechanism for removing the poultry from the shackle, while another one of the photosensititve cells energizes a disabling means which disables the poultry-ejecting means, so that the poultry is ejected from the conveyor only when the light is blocked from the first of the two photosensitive cells.

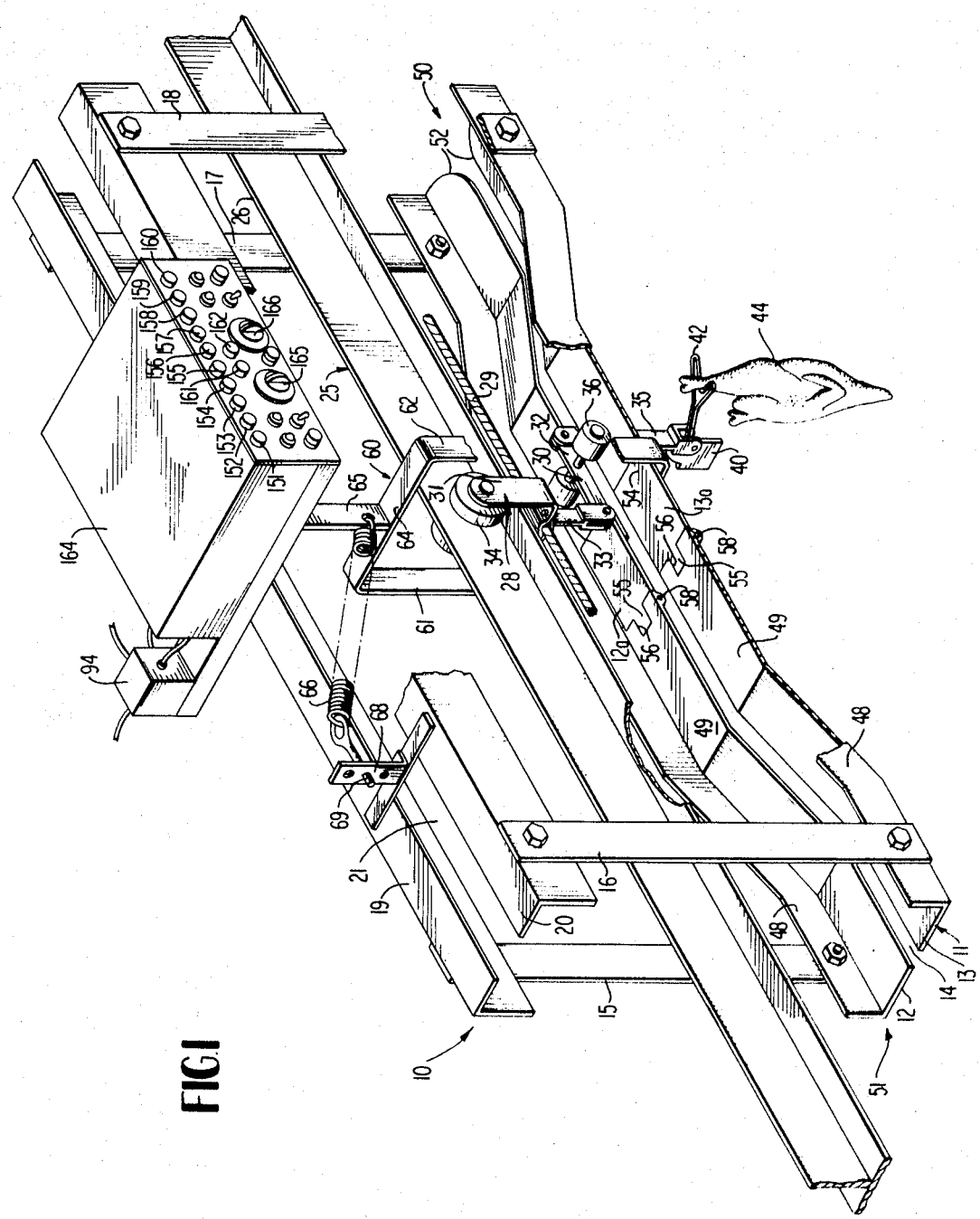

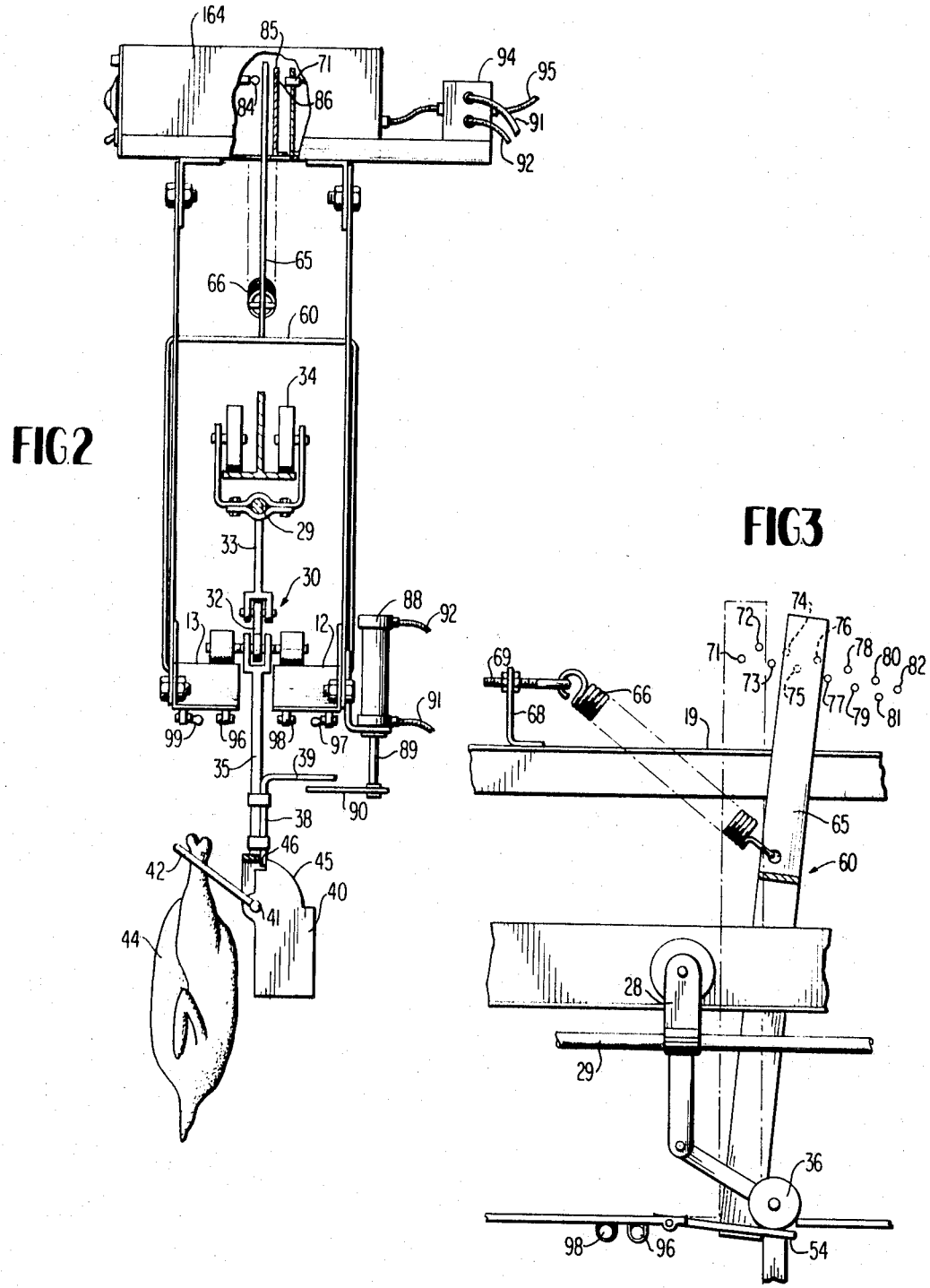

POULTRY SELECTOR SYSTEM

BACKGROUND OF THE DISCLOSURE

In a modern poultry-processing plant the poultry is automatically handled by an overhead conveyor and carried to the various processing stations. The conveyor usually comprises a plurality of spaced poultry carrying shackles suspended at their upper ends by an inverted T-shaped rail and moved along the rail by a continuous cable or chain structure. A leg of each fowl carried by the conveyor is inserted into a V-shaped wedge member at the bottom of the shackle, and the poultry is discharged from the shackle by inverting the V-shaped wedge. A pawl usually maintains the V-shaped wedge in an upwardly inclined position to hold the leg of the fowl, and an air-actuated discharge lever is usually positioned adjacent the conveyor line for engaging the pawl and lifting it out of engagement with the V-shaped wedge to allow the wedge to invert and drop the fowl.

In the past when it was desirable to package and ship fowl at weights above, below or within a predetermined weight range, various devices were placed adjacent the conveyor line for weighing the fowl-carrying shackles and energizing the discharge lever in response to the weight of the fowl. This caused fowl of specified weight to be discharged at the different stations. One of the most popular weighing and discharging mechanisms used to date comprises a track assembly having two moveable sections which determine if the fowl-carrying shackle passing over these sections is over the weight limit set in one of the sections and under the weight limit set for the other of the sections. The arrangement is such that if the fowl-carrying shackle exceeds the lower limit and does not exceed the upper limit, a discharge mechanism will be actuated; and if the fowl-carrying shackle exceeds both weight limits of both moveable sections, the second moveable section will disable the first moveable section by a complicated mechanical disabling mechanism, thereby preventing the first moveable track section from actuating the fowl discharge mechanism. While these devices have met with some success in that they appear to be the best available on the market at the present time, the complicated structural arrangement is such as to render the devices expensive, the devices are necessarily large and cumbersome, and the devices comprise a plurality of moving parts which must be carefully fabricated, balanced, and which must be replaced from time to time.

SUMMARY OF THE INVENTION

Briefly described the present invention comprises a poultry selector system that includes a small number of moving parts and has a track with a pair of spaced apart parallel rails defining an open slot there between for accommodating and lifting the poultry carrying shackles of the conveyor. A section of the track is moveable in a downward direction like a door so as to form an inclined ramp under the weight of the poultry-carrying shackle. The moveable track section is biased in an upward direction so that the distance through which he moveable track section moves is proportional to the weight of the poultry-carrying shackle. A plurality of photosensitive cells detect the distance through which the moveable track section pivots which detects the weight of the poultry-carrying shackle. A poultry-discharge mechanism is actuated when the weight of the poultry-carrying shackle is detected to be within a selected range, or when one of the selected photosensitive cells is energized but not when two of the selected photosensitive cells are energized.

Thus, it is an object of this invention to provide a poultry selector system that comprises a small number of moving parts, which is inexpensive to manufacture and maintain and which is highly reliable in selecting and discharging poultry which weighs within a preselected range of the weights.

Another object of this invention is to provide a simplified electromechanical apparatus for selecting and discharging poultry within a predetermined weight range from a poultry conveyor.

Other objects, features and advantages of the present invention will become apparent upon reading the following specification when taken into conjunction with the accompanying drawings.

DESCRIPTION OF THE DRAWING

FIG. 1 is a perspective view of the poultry selector system, with parts broken away for clarity.

FIG. 2 is an end view of the poultry selector system.

FIG. 3 is a schematic representation of the manner in which the photosensitive cells detect the movement of the moveable track section.

DESCRIPTION OF THE PREFERRED EMBODIMENTS

Figure 4:
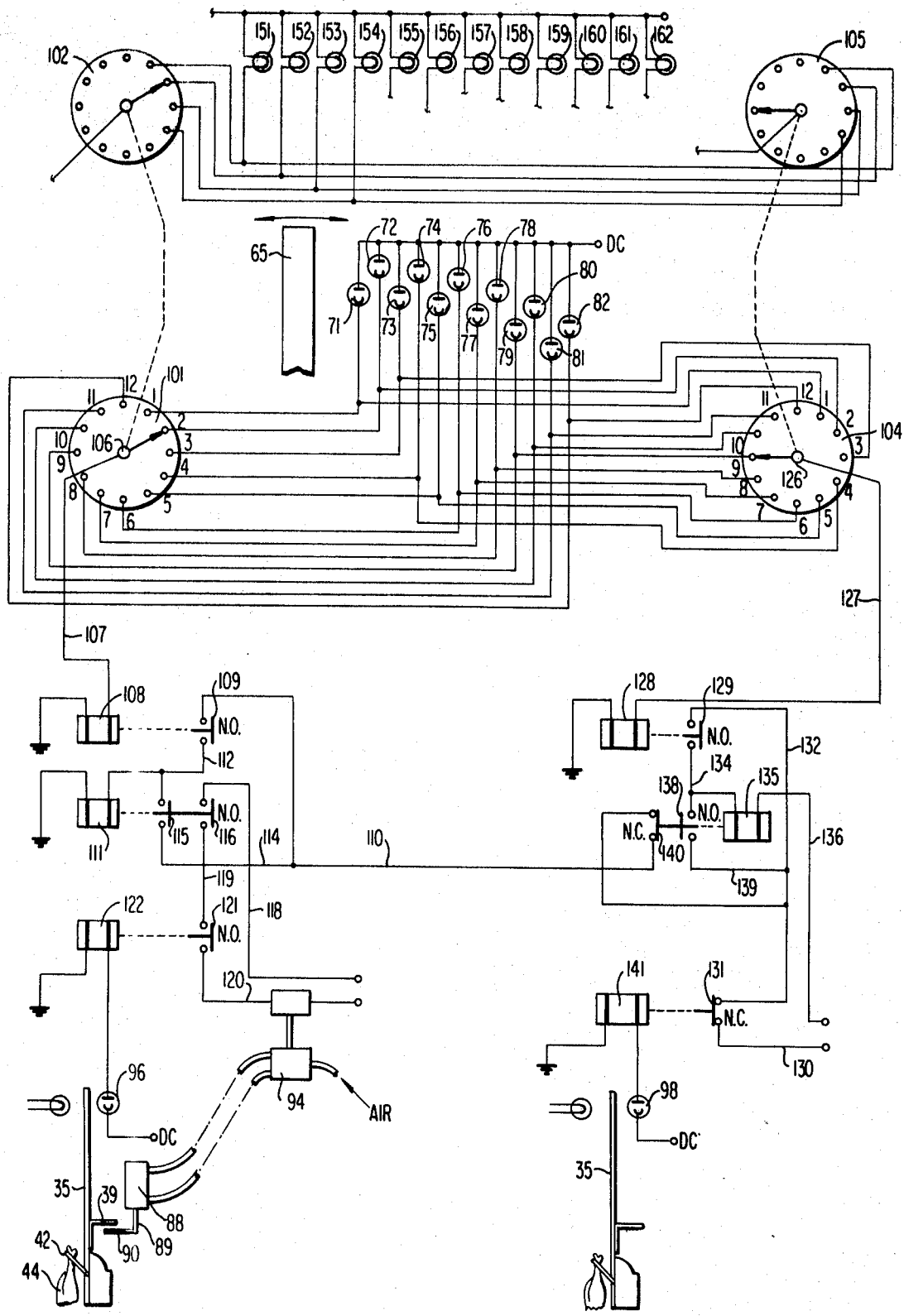
FIG. 4 is an electrical schematic of the poultry selector system.

Referring now in more detail to the drawing, in which like numerals indicate like parts at several views, FIG. 1 shows poultry selector system 10 which includes track 11 having spaced apart rails 12 and 13. Slot 14 extends between rails 12 and 13 and is open ended. Rails 12 and 13 are supported by support straps 15, 16, 17 and 18 which extend downwardly from a pair of horizontal support beams 19 and 20. Support beams 19 and 20 are also spaced apart and define slot 21 therebetween.

Poultry selector system 10 is placed about poultry conveyor 25 which comprises an inverted T-shaped rail 26, a plurality of spaced apart trollies 28, a continuous cable or chain member 29 and a plurality of spaced apart shackle assemblies 30. Each trolley 28 comprises a U-shaped bracket 31 with a pair of trolley wheels 34 connected to the inside of each of its legs and in engagement with the T-shaped rail 26. A shackle assembly 30 is connected to each trolley 28 and includes pivotal links, 32 and 33, shackle leg 35 and rollers or wheels 36 protruding on opposite sides of the assembly. As is best shown in FIG. 2, the lower end of shackle leg 35 includes a moveable pawl 38 having an outwardly extending leg or protrusion 39. Cam weight 40 is pivotally connected to the lower end of shackle leg 35 by pivot pin 41, and V-shaped bracket 42 is rigidly connected to cam weight 40 and is sized and shaped to grasp the joint of the leg of a chicken or similar edible fowl. When pawl 38 is moved in an upward direction it disengages cam weight 40 and the weight of the fowl 44 causes V-shaped bracket 42 and cam weight 42 to pivot about pivot pin 41, which allows the leg of the fowl 44 to drop out of the inverted bracket 42. When the fowl drops away from the shackle assembly, the weight of cam weight 40 causes the cam weight and V-shaped bracket 42 to return to the position shown. When the pawl 38 is dropped, it will engage the round surface 45 of cam weight 40 until the cam weight is upright and it then drops into notch 46, thus locking the cam weight and V-shaped bracket in their upright positions.

As is best shown in FIG. 1, the rails 12 and 13 of track 11 are generally L-shaped and each includes side flanges 48 and load-bearing surfaces 49. The entrance end 50 of track 11 is inclined upwardly, while the exit end 51 is inclined downwardly. Also, the load-bearing surfaces 49 of rails 12 and 13 are tapered at 52 at the entrance end 50. With this arrangement when a shackle assembly approaches poultry selector 10, the shackle leg 35 will be guided toward slot 14 by the taper 52 of load-bearing surfaces 49 so that the shackle leg enters slot 14. As the shackle assembly 30 moves on into poultry selector 10, wheels 36 engage the load-bearing surfaces 49 of the rails, which functions to lift wheels 36 and the lower portion of shackle assembly 30. Links 32 and 33 generally trail behind trolley 28 as illustrated in FIG. 1. Wheels 36 then carry virtually the entire load of the lower portion of shackle assembly 30 which includes the shackle leg, cam weight, V-shaped bracket, and the poultry.

The center portion of track 11 comprises a moveable track section 54 which is cut from the load-bearing surfaces 49 of rails 12 and 13. Moveable rail sections 12A and 13A are positioned across from each other in track 11 and each comprise a hinge tongue 55. The portions of rails 12 and 13 adjacent the hinge tongue 55 of moveable rail sections 12A and 13A are shaped in a corresponding manner and form a mating groove 56 so that when moveable rail sections 12A and 13A are in alignment with rails 12 and 13 a substantially continuous surface is formed. Pivot pins 58 extend through rails 12 and 13 through their grooves 56 and through the tongues 55 of moveable rail sections 12A and 13A. Pivot pins 58 are in alignment with each other and extend laterally across the length of track 11 so that moveable rails sections 12A and 13A hingedly open in a downward direction about pivot pins 58 with a doorlike movement.

Yoke 60 comprises side legs 61 and 62, cross strap 64, and extension 65. Legs 61 and 62 are connected at their lower ends to moveable rail sections 12A and 12B. Yoke 60 is otherwise unattached to any rigid portion of the assembly. As is best shown in FIGS. 1 and 3, extension 65 of yoke 60 is connected to one end of tension spring 66. Bracket 68 is connected to the other end of spring 66 and to horizontal support beams 19. Adjustment bolt 69 forms a part of bracket 68 and functions to adjust the tension of spring 66.

As is best shown in FIGS. 2, 3 and 4, a plurality of photosensitive cells 71, 72, 73, 74, 75, 76, 77, 78, 79, 80, 81 and 82 are positioned closely adjacent to one another in arcuate arrangement. The odd numbered photocells are offset from the even numbered-photocells so that there is virtually no horizontal distance between adjacent ones of the photocells. A light source (not shown) is provided for each photocell 71–82 as indicated at 84 in FIG. 2. Shield 85 is positioned between the row of photocells 71–82 and the row of lights 84. The shield defines a series of openings 86 (only one shown) which are in alignment with photocells 71–82 and their respective lights. Extension 65 is arranged to pass between the lights and shield 85 to break the light beams to the photocells. As is shown in the dash lines of FIG. 3, extension 65 is moveable in sequence across the light beams to the photocells 71–82 to sequentially break the light beams.

As is best shown in FIG. 2, pneumatic motor 88 is connected to the side of rail 12 nd includes downwardly extending piston 89 and lifter arm 90 for engaging the leg of the pawl of the shackle assemblies. Pneumatic pressure lines 91 and 92 each communicate at one of their ends with pneumatic motor 88 and at their other ends with solenoid valve 94. Pressure supply line 95 is connected to solenoid valve 94 and functions to supply air under pressure to the valve. This causes motor 88 to function as an article discharge means. Photosensitive cells 96 and 98 are attached to the bottom surfaces of rails 12 and 13, and corresponding lights 97 and 99 are mounted on the opposite rails 12 and 13. Photosensitive cells 96 and 98 are spaced along the length of track 11 and function to sequentially detect the presence of a poultry-carrying shackle assembly 30. Photosensitive cell 98 is positioned adjacent pneumatic motor 88 and its lifter arm 90.

As is best shown in FIG. 4, the circuitry for controlling poultry selector 10 comprises paired rotary switches 101 and 102 and paired rotary switches 104 and 105. Each of the rotary switches comprises 12 numbered contacts. The like-numbered contacts of rotary switches 101 and 104 are connected in parallel to one of the photosensitive cells 71–82. For instance, contacts numbered 1 of switches 101 and 104 are connected to photosensitive cell 71, contacts numbered 2 of switches 101 and 104 are connected to photosensitive cell 72, and so on. The center contact 106 of switch 101 is connected to drop relay 108 which includes a normally open contact 109. When contact 109 is momentarily closed, it connects voltage source conductor 110 to hold relay 111 through conductor 112. Voltage is then applied to hold relay 111 through conductor 114 and the closed contact 115, so that normally open contacts 115 and 116 are maintained closed by a holding circuit. This causes a circuit to be made to solenoid control valve 94 through conductors 118, 119 and 120, except for normally open contact 121 of relay 122. When photosensitive cell 96 located at the bottom of track 11 detects a shackle leg 35, normally open contact 121 will be momentarily closed by relay 122 to make the circuit to solenoid to control valve 94 to direct the air to pneumatic motor 88 and lift piston 89 and lifter arm 90 into engagement with leg 39 of pawl 38 of the shackle and allow the fowl 44 to be released from the V-shaped bracket 42.

Rotary switch 104 has its center contact 126 connected through conductor 127 with relay 128. The normally opened contact 129 of relay 128 momentarily closes to make the circuit from conductor 130, normally closed contact 131, conductor 132, conductor 134, normally open relay 135 and conductor 136. When normally open contact 138 of relay 135 is closed, a holding circuit is made through conductor 139, contact 138, to relay 135. Thus relay 135 remain energized even through normally open contact 129 of relay 128 opens. Normally closed contact 140 of relay 135 opens upon actuation of relay 135. Contact 140 thus opens or disables the circuit made through conductor 110 and hold relay 111. This causes the circuit to solenoid air valve 94 to be opened or disarmed which disables pneumatic motor 88 so that the fowl 44 will not be discharged from shackle 35.

As shackle 35 continues to pass through poultry selector system 10, it breaks the light beam to photocell 98. This causes normally closed contact 131 of relay 141 to open, to open the circuit made to relay 135. This causes contact 138 to break and contact 140 to make, and rearms the system.

Rotary switch 102 moves in unison with rotary switch 101, while rotary switch 105 moves in unison with rotary switch 104. The numbered contacts of rotary switches 102 and 105 are connected in parallel to indicating lights 151–162. The indicating lights are placed on the face of housing 164 (FIG. 1) together with dial faces 165 and 166 of the rotary switches. Thus, when rotary switches 101, 102, 104 and 105 are set, an indication will be received from lights 151–162.

OPERATION

When the poultry conveyor 25 is in operation, the series of trollies 28 mounted on the conveyor will pass through poultry selector system 10. As each trolley approaches the selector system, its shackle assembly 30 will be received in the slot 14 of track 11. Wheels 36 of the shackle assembly pass up the inclined portion of the track and gradually assume substantially the entire weight of the shackle leg, cam weight 40, V-shaped bracket 42 and the poultry 44 suspended beneath the shackle assembly. When the wheels 36 are received on moveable rail sections 12A and 13A of rails 12 and 13, the rail sections pivot about pivot pins 58 and allow the moveable track section 54 to drop or open, in the manner illustrated in FIG. 3. This causes yoke 60 to pivot from its dashed line position to its full line position (FIG. 3), and causes spring 66 to stretch. The stretching spring resists the opening movement of moveable track section 54 with increasing resistance. Thus, the heavier the weight carried by wheels 36 the more the moveable track section 54 moves or opens.

When moveable track section 54 is moved or pivoted in a downward direction, it forms a ramp or incline with respect to the stationary rails 12 and 13. As trolley 28 continues in its movement, it pulls wheels 36 up the incline of the moveable track section until it removes enough weight from the moveable track section so that the moveable section closes due to the influence of the tension spring 66. Since the leverage from pivot pins 58 back to the wheels of the shackle assembly progressively decreases from the point where wheels 36 first engage moveable track section 54, moveable track section 54 will close before wheels 36 reach pivot pins 58. This effectively eliminates any bump or irregularity in the path of travel of wheels 36 as they pass from their dropped position on moveable track section 54 as illustrated in FIG. 3 back up to the surface of the stationary rails 12 and 13.

The opening or downward movement of moveable track section 54 causes yoke 60 to pivot from its dash lined position of FIG. 3 across one or more of photosensitive cells 71–82.

The distance extension 65 of yoke 60 travels is determined by the weight applied to moveable track section 54 by wheels 36 of shackle assembly 30.

As is best illustrated in FIG. 4, when rotary switch 101 is positioned so that its center contact 106 engages one of the contacts numbered 1 through 12, the corresponding photosensitive cell will be connected to drop relay 108. For instance, when center contact 106 is connected to contact numbered 2, photosensitive cell 72 will be connected to drop relay 108. In a similar manner, when center contact 126 of rotary switch 104 is in contact with the contact numbered 9, photosensitive cell 79 will be connected in series with hold relay 128.

If the weight applied to moveable track section 54 is sufficient to cause extension 65 to pivot to a position to momentarily block photosensitive cell 72 from its light source, a pulse will be received by drop relay 108, causing its normally open contact 109 to close momentarily. This is sufficient to apply a voltage from voltage source conductor 110 through contact 109, conductor 112, and through hold relay 111 and cause the normally open contacts 115 and 116 of hold relay to close. A holding circuit is made from conductor 110 through conductor 114, contact 115, to relay 111. This maintains normally open contacts 115 and 116 in a closed condition.

When a photosensitive cell 96 at the bottom of track 11 has its light source momentarily broken by a shackle leg 35, trip relay 122 will momentarily close its normally open contact 121. This causes a circuit to be made from conductor 118 through contact 116 of hold relay 111, conductor 119, contact 121, and conductor 120 to solenoid air valve 94. This causes a surge of air to flow from solenoid air valve 94 to pneumatic motor 88 to momentarily lift lifter arm 90 into engagement with leg 39 of pawl 39 to drop the poultry from shackle leg 45.

In the meantime, if extension 65 of yoke 60 passes between photosensitive cell 79 and its light source, a pulse will be made to relay 128 to momentarily close its normally open contact 129. This is sufficient to momentarily make a circuit from conductor 130, normally closed contact 131, conductor 132, through contact 129, conductor 134, relay 135 and conductor 136. Relay 135 then closes its normally open contact 138 and opens its normally closed contact 140. Contact 138 creates a holding circuit through relay 135 so that relay 135 remains energized to hold contact 140 open. This breaks the source of voltage to conductor 110 and disarms hold relay 111. When hold relay 111 is deenergized, contact 116 is opened and the circuit previously made to solenoid air valve 94 is disarmed so that the passage of shackle leg 135 is between photosensitive cell 96 and its light source no longer causes solenoid air valve 94 to function, and the poultry present on shackle leg 35 will not be discharged.

As the conveyor trolley 28 continues its movement through poultry selector 10, shackle leg 35 breaks the light source to photosensitive cell 98, which momentarily energizes relay 141 and causes its normally closed contact 131 to open. This breaks the circuit made to relay 135, thus deenergizing relay 135 and its contact 138 opens while its contact 140 closes. This rearms the left portion of the circuitry, so that when another pulse is received from photosensitive cell 72 by the movement of yoke 60, the sequence of operation will be repeated.

The arrangement of the circuitry is such that if yoke 60 is not moved far enough to break the source of light to photosensitive cell 72, no action will be taken by pneumatic motor 88 to discharge the poultry from the shackle assembly. If the movement of yoke 60 is sufficient to break the light source to photosensitive cell 72 but is not sufficient to break the light source to photosensitive cell 79, pneumatic motor 88 will function as described to discharge the poultry from the shackle assembly. If the weight of the poultry carried by the shackle assembly is sufficient to cause yoke 60 to move far enough to break the light source to photosensitive cell 79, the voltage supply to conductor 110 will be terminated, thus disarming the system. When the conveyor moves further through the poultry selector system 10, shackle leg 35 will eventually break the light source to photosensitive cell 98 which reestablishes voltage to conductor 110, so that the system will again be armed and able to operate the next time yoke 60 interrupts the source of light to photosensitive cell 72.

While the circuitry of FIG. 4 has been disclosed with rotary switches 101 and 104 each positioned in only one location, it will be understood that these switches can be changed so as to rotate center contacts 106 and 126 into contact with various ones of the numbered contacts, to change the response of the system. For instance, if center contact 126 of rotary switch 104 is moved to a higher numbered contact, the weight range through which the system will select and discharge fowls will be increased. Conversely, if center contact 126 is moved to a lower number, the weight range will be decreased. Center contact 106 of rotary switch 101 works in a similar manner but at the other end of the weight range. Rotary switches 102 and 105 will always indicate the weight range selected for the system.

While the invention has been disclosed in combination with a poultry conveyor system, it should be apparent that various other objects can be weighed and selected with a structure which operates under the disclosed principles. For instance, fresh vegetables, fish, other edible foods, grain and other granular materials and virtually any variable weight object or package can be weighed and selected or rejected with the disclosed principles of operation. Thus, while the invention has been described in detail with particular reference to the preferred embodiments thereof, it will be understood that variations and modifications can be effected within the spirit and scope of the invention as described hereinbefore.

I claim:

1. Apparatus for selecting poultry within predetermined weight limits from a poultry conveyor of the type including a plurality of poultry-carrying shackles suspended at spaced intervals from a conveying mechanism and moveable along a predetermined path, with each shackle including laterally extending protrusions intermediate its length, said apparatus comprising a track including a pair of substantially horizontal spaced apart parallel rails defining a central open-ended slot for receiving the shackles as the laterally extending protrusions are supported by the rails, a weight-sensing station in said track comprising adjacent rail sections in said track hingedly connected so as to open in a downward direction through said track, biasing means for urging said rail sections toward their closed positions, and fowl-discharge means responsive to the position of said rail sections to remove fowl from said shackles when said rail sections are moved beyond a first position but not beyond a second position.

2. The invention of claim 1 and wherein said rail sections are arranged to open and allow each shackle to initially move in a downward direction and then move up the incline of the rail sections.

3. The invention of claim 1 and wherein said fowl-discharge means comprises a plurality of photosensitive cells, means moveable with said rail sections to sequentially block the light entering said photosensitive cells, an ejecting means responsive to one of said photosensitive cells to discharge the fowl carried by the shackle, and disabling means responsive to another one of said photosensitive cells to disable said ejecting means.

4. In combination with a conveyor system for conveying suspended articles in spaced relation at a predetermined speed to a delivery station, a plurality of spaced trolleys for carrying articles suspended therebelow, means for removing the articles between preset minimum and maximum weight limits from said trolleys prior to the deposit of the articles at a delivery station comprising an article discharge means, a weight sensing station in the conveyor system through which the trolleys sequentially pass, said weight sensing station comprising a generally horizontal platform over which said trolleys pass with a section pivotable in a downward direction from a generally horizontal attitude coextensive with said platform to upwardly inclined attitudes with respect to the movement of said trolleys through longer distances in response to heavier weights applied thereto, first control means responsive to the movement of said platform section through said first distance to actuate said article discharge means, and second control means responsive to the movement of said platform section through a second distance to disable said first control means, whereby when a trolley exceeding a first predetermined weight but not exceeding a second predetermined weight passes over said platform section the article-discharge means is actuated to remove the article from the trolley.

5. The invention of claim 4 and wherein said weight-sensing station comprises a series of closely spaced stationary photosensitive cells and means moveable with said platform section to sequentially block light entering said photosensitive cells.

6. A conveyor system for conveying poultry or the like including a conveyor rail, a continuous chain member moveable along said conveyor rail, a plurality of spaced apart trolleys connected to said continuous chain member and supported by said conveyor rail, a shackle assembly suspended from each trolley, each shackle assembly including support means at its lower end for supporting poultry or the like and a laterally extending protrusion above said support means, a track positioned below and extending along said conveyor rail and including an elevated center portion and inclined portions at its ends arranged to sequentially receive and elevate the laterally extending protrusions of said shackle assemblies and support the lower portions of said shackle assemblies as the shackle assemblies move with said continuous chain member along said conveyor rail, a weight-sensing station in the elevated center portion of said track comprising a track section hingedly connected so as to pivot in a downward direction under the weight of the lower portion of said shackle assemblies and the poultry carried thereby, means for urging said track section in an upward direction, and discharge means responsive to the position of said track section to remove the poultry from said shackles when said track section is moved downwardly a predetermined distance.

* * * * *